United States Patent [19]

Kimura et al.

[11] 4,397,752

[45] Aug. 9, 1983

[54] HEAT STORAGE MATERIAL

[75] Inventors: Hiroshi Kimura; Junjiro Kai, both of Amagasaki, Japan

[73] Assignee: Mitsubishi Denki Kabushiki Kaisha, Tokyo, Japan

[21] Appl. No.: 295,147

[22] Filed: Aug. 21, 1981

[30] Foreign Application Priority Data

Aug. 21, 1980 [JP] Japan .............................. 55-115450
May 7, 1981 [JP] Japan .................................. 56-69215

[51] Int. Cl.³ .............................................. C09K 3/18
[52] U.S. Cl. ...................................... 252/70; 252/71; 252/74
[58] Field of Search ............................ 252/70, 71, 74; 126/900; 165/104.17

[56] References Cited

FOREIGN PATENT DOCUMENTS 2753598  6/1979  Fed. Rep. of Germany .
51-128052 11/1976 Japan .
55-54380  4/1980 Japan .
56-141380 11/1981 Japan .

OTHER PUBLICATIONS

"An Incongruent Heat-of-Fusion System - CaCl$_2$-6H$_2$O - Made Congruent Through Modification of the Chemical Composition of the System": B. Carlsson, H. Stymne and G. Wettermark; Solar Energy, vol. 23, pp.343-350, (1979).

"Solar Energy Storage", Dr. Maria Telkes, Ashrae Journal, Sep. 1974, pp. 38-44.

"Macro-Encapsulation of Heat Storage Phase—Change Materials", G. A. Lane, Proceedings of Second Annual Thermal Energy Storage Contractors' Information Exchange Meeting, Sep. 1977, pp. 43-67.

Chemical Abstracts, vol. 84, 1976, Ref. 108450v, blz. 177, Columbus, Ohio (US) & JP - A - 75 90585, (Tokyo Electric Power), (Jul. 19, 1975).

Chemical Abstracts, vol. 86, 1977, Ref. 19533y, blz. 182, Columbus, Ohio (US) & JP - A - 76 76183, (Itsubishi Electric Corp.), (Jul. 1, 1976).

Primary Examiner—John E. Kittle
Assistant Examiner—Hoa V. Le
Attorney, Agent, or Firm—Oblon, Fisher, Spivak, McClelland & Maier

[57] ABSTRACT

A heat storage material comprises CaCl$_2$ hydrate has a water content at a molar ratio of more than 6.0 and less than 6.14 based on CaCl$_2$ 6 Claims, 2 Drawing Figures

HEAT STORAGE MATERIAL

BACKGROUND OF THE INVENTION

1. Field of the Invention

The present invention relates to a heat storage material comprising $CaCl_2$ hydrate for heat storage and radiation with a latent heat in a phase change of fusion and solidification. The heat storage material is used for an air-conditioning, a waste heat recovery or a solar heat storage.

2. Description of the Prior Art

It is most important for the latent heat storage material to be always stable in the repeating heat storage and radiation.

$CaCl_2.6H_2O$ has been considered to be optimum, since it results in the phase change at 29° C. and has a latent heat of 41 cal/g. and is economical. However, when $CaCl_2.6H_2O$ is repeatedly phase-changed, a crystallization of $CaCl_2.4H_2O$ ($\alpha$-phase: melting point of 45° C.; $\gamma$-phase: melting point of 38° C.) is easily caused. The $\alpha$-phase having a high melting point is usually found. When such crystallization is caused, the crystal precipitates at the bottom of the fused liquid. Thus, the phase change to $CaCl_2.6H_2O$ is not attained in the solidification. It is necessary to prevent the crystallization of $CaCl_2.4H_2O$ in order to use $CaCl_2.6H_2O$ as the heat storage material.

In order to overcome the above-mentioned disadvantages, (a) the maximum temperature in the heating step is given to about 50° C. so as to melt $CaCl_2.4H_2O$ or (b) a small amount of $SrCl_2.6H_2O$ is added to shift the peritectic composition to the side of $CaCl_2.6H_2O$ or (c) a large amount of water is added.

As a reference, the relation of the region of crystallization of $CaCl_2.4H_2O$ and the phase is shown in FIG. 1 wherein a concentration of $CaCl_2$ (wt.%) is plotted on the abscissa and a temperature is plotted on the ordinate and the references x, $\Delta$ and • respectively designate the conditions of the temperature and the concentration for resulting in the growth of $\alpha$-phase, $\beta$-phase or $\gamma$-phase of $CaCl_2.4H_2O$. The binary phase diagram of $CaCl_2$-$H_2O$ is referred to B. Bergthorsson; Acta Chem. Scand 26 (1973) No. 3, 1292.

The following disadvantages are found as the proposals for preventing the crystallization of $CaCl_2.4H_2O$.

With regard to the proposal (a), the application is remarkably limited. With regard to the proposal (b), only tests are carried out but the practical application is not attained. Sometimes, the addition of the second component causes the crystallization of $CaCl_2.4H_2O$. With regard to the proposal (c), a heat of fusion is remarkably reduced to be 30 cal/g. or lower.

SUMMARY OF THE INVENTION

It is an object of the present invention to provide a latent heat storage material which does not result in a crystallization of $CaCl_2.4H_2O$ in repeated fusion-solidification cycles.

It is another object of the present invention to provide a latent heat storage material for utilizing a latent heat of fusion at 15° to 25° C.

The foregoing and other objects of the present invention have been attained by providing a heat storage material comprising $CaCl_2$ hydrate having a water content at a molar ratio of more than 6.0 and less than 6.14 base on $CaCl_2$. The heat storage material can comprises $CaCl_2$ hydrate having a water content of more than 6.0~less than 6.14 mols per mol of $CaCl_2$ and at least one component selected from the group consisting of $CaBr.6H_2O$, $MgCl_2.6H_2O$ and $MgBr_2.6H_2O$.

DETAILED DESCRIPTION OF THE PREFERRED EMBODIMENTS

The present invention is based on the finding of the range of the composition for preventing the crystallization of $CaCl_2.4H_2O$ by incorporating a specific small amount of water to $CaCl_2.6H_2O$ in heat cycle tests for a long time.

The results of the heat cycle tests are shown in Table 1.

In the heat cycle tests, each sample is charged into a glass tube having an inner diameter of 20 mm and a length of 1,000 mm and the glass tube is closed and treated by heat changes in a range of 35° C.–18° C. in 8 cycles per day.

TABLE 1

| | Result of heat cycle test: | | |
|---|---|---|---|
| Sample | Water content (mol of water) | Crystallization of $CaCl_2.4H_2O$ | Time of heat cycles |
| 1 | 5.66 | crys. | 3 times |
| 2 | 5.80 | crys. | 3 times |
| 3 | 5.85 | crys. | 3 times |
| 4 | 6.00 | crys. | 10 times |
| 5 | 6.05 | none | 400 times or more |
| 6 | 6.08 | none | 400 times or more |
| 7 | 6.11 | none | 400 times or more |
| 8 | 6.14 | none | 400 times or more |

Note:
per mol of $CaCl_2$
crys.: crystallization

Figure 2:
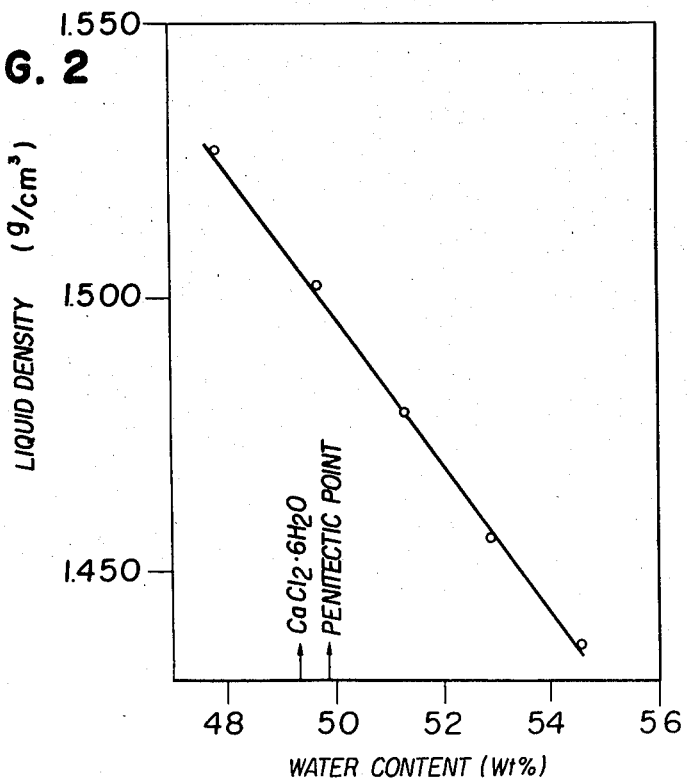
FIG. 2 is a calibration curve of liquid density—water content.

The water content of the sample is measured from the calibration curve of liquid density-water content shown in FIG. 2 by using a specific gravity bottle for liquid (the capacity is calibrated). In FIG. 2, the abscissa is for the water content (wt.%) and the ordinate is for the liquid density (g/cm$^3$).

In the case of the samples having a water content of 6.05–6.14 mol per mol of $CaCl_2$, (Samples 5–8) no crystallization of $CaCl_2.4H_2O$ is found in the heat cycle test for 400 times or more of cycles and the smooth repeated phase changes are found.

Figure 1:
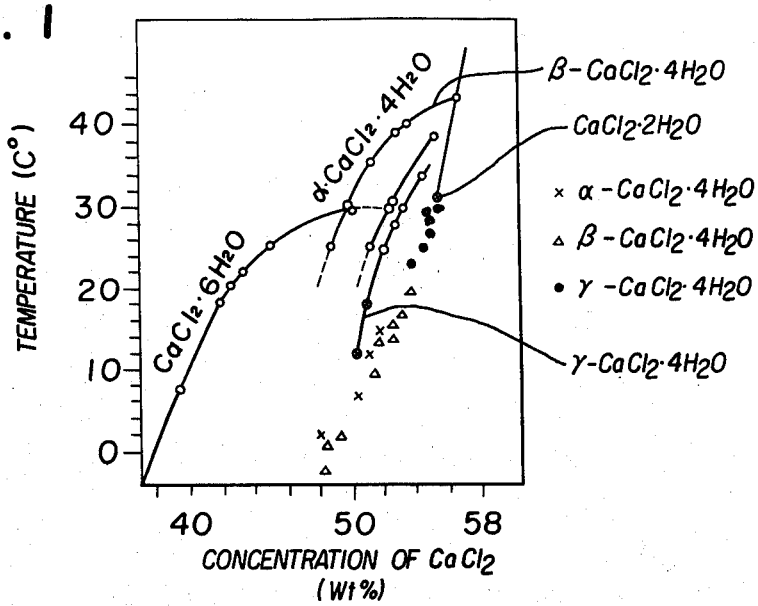
FIG. 1 is a binary phase diagram of $CaCl_2$-$H_2O$.

As shown in FIG. 1, the composition of the liquid phase in the fusion of $CaCl_2.6H_2O$ as the peritectic composition, the water content is about 6.14 mols per mol of $CaCl_2$. Thus, the compositions of the samples which have water contents ranging from 6.05 to 6.14 mols per mol of $CaCl_2$ are higher in their concentrations of $CaCl_2$ than that of the peritectic composition. In view of the conventional phenomenon, the range of the composition is the range for causing a crystallization of $CaCl_2.4H_2O$. The reason why the crystalllization of $CaCl_2.4H_2O$ is not caused in the samples having such range of the composition is not clearly understood. The samples having the range of the composition have the heat of fusion of 40 cal/g. or higher and result in the phase change at 28°–29° C. Therefore, they are remarkably useful as the latent heat storage materials in the temperature range.

In the other embodiment, the latent heat storage material comprises the $CaCl_2$ hydrate having a water content of more than 6.0 to less than 6.14 mol per mol of $CaCl_2$ and at least one component of $CaBr_2.6H_2O$, $MgCl_2.6H_2O$ and $MgBr_2.6H_2O$.

When a water content of the $CaCl_2$ hydrate is less than 6 mols per mol of $CaCl_2$, even though $CaBr_2.6H_2O$, $MgCl_2.6H_2O$ or $MgBr_2.6H_2O$ is added, the crystallization of $CaCl_2.4H_2O$ is found in the repeated heat cycles. Thus, a useful latent heat storage material is not obtained. In the addition of $CaBr_2.6H_2O$ to $CaCl_2.6H_2O$, $\gamma$-phase of $CaCl_2.4H_2O$ (melting point of 38° C.) is found whereas in the addition of one of magnesium chlorides, $\alpha$-phase of $CaCl_2.4H_2O$ (melting point of 45° C.) is found.

In order to overcome the disadvantages, the $CaCl_2$ hydrate having a water content of more than 6.0 and less than 6.14 mols per mol of $CaCl_2$ is used.

The $CaCl_2$ hydrate is prepared by dissolving $CaCl_2.2H_2O$ into water depending upon the calibration curve of water content-liquid density shown in FIG. 2. A desired amount of $CaBr_2.6H_2O$, $MgCl_2.6H_2O$ or $MgBr_2.6H_2O$ is added to the $CaCl_2$ hydrate and a layer melted into a uniform composition to obtain the useful latent heat storage mixture.

The composition having 15 mol % of $MgBr_2.6H_2O$ performs the smooth phase changes for 100 times or more in the heat cycle test of 25° C. to 8° C. without a crystallization of $CaCl_2.4H_2O$.

On the other hand, in the same heat cycle test of the composition of $CaCl_2.5.4H_2O$ as a main component and 15 mol % of $MgBr_2.6H_2O$, a large amount of $CaCl_2.4H_2O$ is crystallized by repeating the phase change for several times to stop the phase change. The same phenomenon is found in the case of the composition of $CaCl_2.5.8H_2O$ as a main component and 15 mol % of $MgBr_2.6H_2O$. The crystallization of $CaCl_2.4H_2O$ is caused just after the initiation of the heat cycle test. The same phenomenon is also found in the case of the composition of $CaCl_2.5.8H_2O$ and 15 mol % of $MgCl_2.6H_2O$ in the heat cycle test of 27° C. to 10° C.

As the compositions having $CaBr_2.6H_2O$, the compositions having 20 mol % or 50 mol % of $CaBr_2.6H_2O$ are tested. The desired stability of phase change is found in both cases using $CaCl_2$ hydrate having a water content of more than 6 mols such as about 6.1 mols per mol of $CaCl_2$ as a main component.

The reason why the crystallization of $CaCl_2.4H_2O$ is prevented, can not be clearly found. Excess water of the main component may prevent the crystallization of $CaCl_2.4H_2O$.

Certain examples of the second embodiment are described.

Sample 9

A uniform fused liquid is obtained by mixing 85 mol % of $CaCl_2.6.1H_2O$ with 15 mol % of $MgCl_2.6H_2O$ and fusing the mixture (melting point of 22° C.). In the heat cycle test of 27°–10° C., the smooth phase change is repeated for 100 times or more without any $CaCl_2.4H_2O$ formation.

Sample 10

A uniform fused liquid is obtained by mixing 80 mol % of $CaCl_2.6.08H_2O$ with 20 mol % of $CaBr.6H_2O$ and fusing the mixture (melting point of 20° C.). In the heat cycle test of 25°–8° C., the smooth phase change is repeated for 500 times or more without any $CaCl_2.4H_2O$ formation.

Sample 11

A uniform fused liquid is obtained by mixing 60 mol % of $CaCl_2.6.04H_2O$ with 40 mol % of $CaBr_2.6H_2O$ and fusing the mixture (melting point of 16° C.). In the heat cycle test of 20° to 5° C., the smooth phase change is repeated for 200 times or more without any $CaCl_2.4H_2O$ formation.

Sample 12

A uniform fused liquid is obtained by mixing 85 mol % of $CaCl_2.6.12H_2O$ with 15 mol % of $MgBr_2.6H_2O$ is and fusing the mixture (melting point of 18° C.).

In the heat cycle test of 25° to 18° C., the smooth phase change is repeated for 100 times or more without any $CaCl_2.4H_2O$ formation.

In accordance with the present invention, the stability of phase change of $CaCl_2.6H_2O$ is attained by the economical method of the addition of only a small amount of water and moreover the following advantageous properties are also attained.

(1) less reduction of the heat of fusion
(2) high temperature generated in the solidification
(3) high crystal growth speed in the solidification.

It has been known that no crystallization is caused at a content of water for higher than a peritectic point. (Japanese Unexamined Patent Publication No. 90,584/1975). In the present invention, the water content of the $CaCl_2$ hydrate is for less than the peritectic point.

We claim:

1. A heat storage material which comprises $CaCl_2$ hydrate having a water content at a molar ratio of more than 6.04 and less than 6.14 based on $CaCl_2$.

2. The heat storage material according to claim 1 which further comprises at least one component selected from the group consisting of $CaBr_2.6H_2O$, $MgCl_2.6H_2O$ and $MgBr_2.6H_2O$.

3. The heat storage material according to claim 2 which comprises 85 mol % of said $CaCl_2$ hydrate and 15 mol % of $MgCl_2.6H_2O$.

4. The heat storage material according to claim 2 which comprises 80 mol % of said $CaCl_2$ hydrate and 20 mol % of $CaBr_2.6H_2O$.

5. The heat storage material according to claim 2 which comprises 60 mol % of said $CaCl_2$ hydrate and 40 mol % of $CaBr_2.6H_2O$.

6. The heat storage material according to claim 2 which comprises 85 mol % of said $CaCl_2$ hydrate and 15 mol % of $MgBr_2.6H_2O$.

* * * * *